April 21, 1953 L. PARKER 2,635,390
METHOD OF FORMING BATTS OF SILICA FIBERS
Filed Dec. 19, 1949
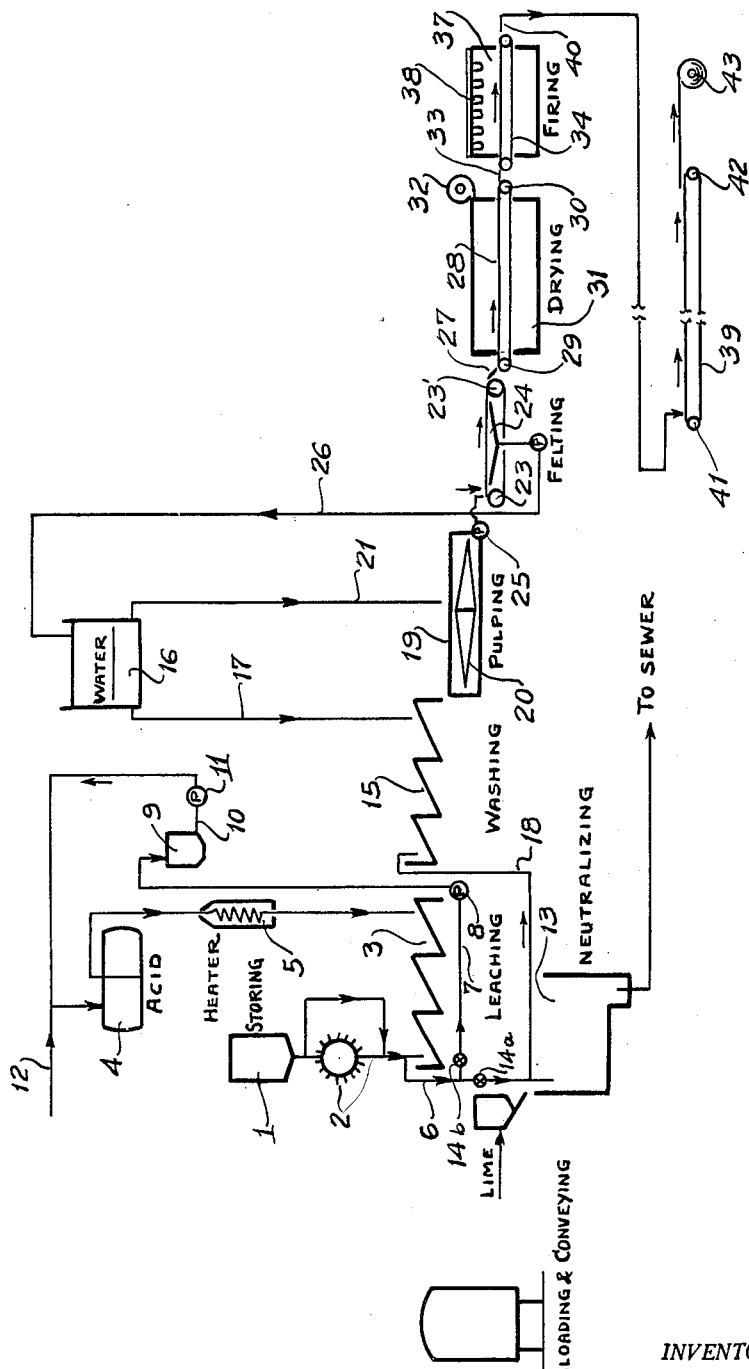
INVENTOR.
LEON PARKER
BY Philip Subkow
ATTORNEY.

UNITED STATES PATENT OFFICE 2,635,390

METHOD OF FORMING BATTS OF SILICA FIBERS

Leon Parker, Burbank, Calif., assignor to The H. I. Thompson Company, Los Angeles, Calif., a corporation of California Application December 19, 1949, Serial No. 133,896

8 Claims. (Cl. 49—79)

It has been shown that glass fibers may be leached to remove the non-siliceous oxides and thus produce fibers of high silica content, the silica content depending upon the degree of extraction of the fibers. Depending upon the composition of the fibers, these non-siliceous oxides may be extracted either by plain water or with acids. While glass fibers of various compositions may be so extracted by both neutral water and acid water, the boro-silicate glasses which are usually employed in forming glass filaments for weaving into textile materials which have less than 70% silica content may be extracted without previous preheating of the glass structure. Such filaments may be leached without such heat treatment and since they are usually of less than .001" in diameter, they may be leached to remove the acid soluble oxides other than silica without destruction of the fiber. The glasses which lend themselves best to drawing into fiber contain about 56% or less of silica, about 22% or less of alumina, about 5% or more of boron oxide and about 22% or less of second group metal oxides, especially lime and magnesia. Such fibers, without preheating, may be readily leached with acid to remove the metal oxides other than silica.

The resultant product contains some water of hydration in the neighborhood of about 8% to 11% and may be dehydrated by heating to temperatures of about 1000° F., preferably in the region of about 1400° to 1600° F. By proper control of the acid extraction process the resultant fibers after firing contain high silica content and may be as high as 90% and even substantially 99.9% of silica as determined by the hydrofluoric acid method.

The above process and the effect of the glass composition and degrees of treatment in producing such extracted glass fibers are described in the Parker and Cole application, Serial No. 669,098, filed May 11, 1946, now Patent No. 2,491,761 and United States Patent No. 2,461,841 issued to Nordberg, to which reference may be had for a more full discussion of this process.

One of the most useful applications of the above process is in the manufacture of batts of silica fibers. Such batts have found particularly useful application as insulating blankets.

In producing the batts for this use it has been the practice as described in the aforesaid Parker-Cole application to form the silica fiber batts by leaching batts of elongated glass fibers which are cemented together by means of resin. This has been necessary since where employing unbonded glass fiber batts, the batts become wadded up in the leaching solution. The resin bonded batts, however, keep their shape during leaching and the resin does not materially interfere with the leaching operation.

A number of difficulties are present in the above procedure. Thus, the batts are formed of long glass fibers and are costly since the elongated glass fibers are costly. The fibers must be bonded by resin, introducing an additional item of cost. Because of the presence of resin in the glass fiber batt, special precautions must be provided to prevent segregation of resin during leaching. As is disclosed in Parker and Zack application, Serial No. 34,354 filed June 21, 1948, now Patent No. 2,500,092, it has been discovered that the ends of the rolls of glass fiber batts leached in the acid become black and brittle on firing. Thus, these ends must be cut off, resulting in a loss of as much as 25% of the cost of the leached and fired batt. This difficulty is corrected in the cited application by rolling the glass fiber batt inside a porous acid resistant blanket.

The process is a batch process, the wrapped blankets are immersed in acid and leached, then removed and introduced into a washing machine and then dried. The batts are unrolled and re-rolled for firing.

I have now devised a simplified procedure which is more expeditious, more economical, omits several of the above steps, and may be employed in a continuous manner. In my present invention I do not attempt to hold the fibers in batt conformation, but rather allow the fibers to become dispersed in the leaching agent. I have found that I can extract the glass fibers in much shorter lengths than employed in forming the glass fiber batts by distributing the fibers in the leaching solution, instead of trying to hold them in batt formation. I can thus avoid the necessity of first forming a glass fiber batt. This makes it possible to employ scrap fibers which are of the order of less than about 1 inch in length. Because I pulp the fibers in the acid I avoid the resin bonding step of the present commercial practice.

The pulped and extracted fibers may then be formed into a blanket and washed by various procedures. Thus, they may be filtered either on a plate or rotary filter to form a filter cake, or formed into a felt by means similar to those used for the felting of cellulose or other fibers. A batt of short fibers is thus produced.

I have found that the felted fibers formed by the filtering operation are sufficiently strong, even when wet, to be rolled or otherwise handled in the firing operation.

By this procedure I also avoid the wrapping operation referred to above and get clean white fired batts of silica with no loss other than the loss due to leaching out of the non-siliceous oxides and the shrinkage of the fibers on dehydration. The firing operation causes a shrinkage of the leached batt and an interlocking of the leached fired fibers and increases the mechanical strength of the batt.

The process will be further described by reference to the drawing, which shows a schematic flow sheet of the process.

The fibers are stored in storage chamber 1 from which they are fed, if they are too long, through the chopper to be cut into fibers of suitable length. If they are of suitable length they may be fed directly to the leaching apparatus. Experience has shown that it is preferable to employ glass fibers greater than ¼" in length, since the batts produced from such fibers are structurally weak. On the other hand, fibers of 2" or more in length are difficult to keep in suspension. It has been found that fibers of from ½ to 1" in length are most usefully employed. They may be readily pulped and stay in suspension adequately and form batts of adequate strength. The fibers of such length are fed into the leaching tank 3.

The feeding of the fibers from the chamber 1 through the cutter 2 and into the leaching chamber may be any of the conventional means for conveying and feeding of dry fibrous material now available as, for example, the application of standard pneumatic conveying machinery, as will be understood by those skilled in this art.

The fibers may be fed into a leaching or washing apparatus 3, as, for example, a Dorr Multideck Classifier, a submerged spiral type of classifier, as Akins Washing Classifier such as, for example, described in Perry Chemical Engineers Handbook, pages 1320, etc. (1934 ed.).

The leaching solution depends upon the type of glass employed in the making of the fibers as indicated above.

I prefer to employ the acid leachable glass fibers referred to above and to employ as acid those acids whose salts of the non-siliceous metallic oxides are soluble in the acid solution. Such acids may be HCl, HNO₃, trichlor acetic acid, or acetic acid. I have found HCl to be a particularly useful acid for this purpose. The portions of the apparatus in contact with the acid are made acid resistant by conventional procedures.

The use of a multistage hydraulic classifier as a leaching apparatus is illustrated schematically. Storage tank 4 contains HCl acid of strength of from about 5 to about 15%. The acid is fed through a heater 5 where it is heated to a temperature of from 100° F. up to boiling; temperatures of about 140 to 180° F. are particularly useful. The acid flowing through the leacher 3 is countercurrent to the passage of the cut fibers and the spent acid overflows through line 6. The time of contact in the leaching chamber may be from 6 minutes to 2 hours, depending on the strength of the acid formed and the degree of extraction desired.

Thus, the extraction may continue until the silica content is of a degree as described above and obtained in the procedures of the above identified patent and patent applications.

The spent acid may be recirculated through line 7 and pump 8 to the spent acid storage 9. It may then be recirculated through line 10 and pump 11 to the acid storage tank 4 where strong acid may be added via 12 to re-establish the acid strength in 4. A portion of the spent acid may be discharged by manipulation of valves 14a and 14b into the neutralizing tank 13 via line 14, where it may be neutralized with lime and discharged to the sewer.

The washed fibers are separated as a thick slurry from the bulk of the acid and conveyed into the washing system 15 of design similar to 3. Water, for example, distilled water, from storage 16 may be used to wash the fibers substantially free of chlorides.

The washed fibers are introduced into pulping tank 19 where the fibers are agitated and dispersed by agitator 20 in the presence of water added through 21. The pulp is discharged through line 21 by pump 22 onto a travelling porous belt such as is used in felting of fibrous material such as paper. The belt, for example, is operated by means of pulleys 23 and 23' actuated by suitable machinery. Such apparatus is conventional in the paper making and felting arts. The belt travels over a vacuum chamber 24 and the excess water is sucked into the vacuum chamber 24 and the water pumped by pump 25 and line 26 into the water storage 16.

The felted fibers are in the form of a batt and are fed off the belt 22 via guide 27 onto the belt 28 operated by pulleys 29 and 30 to pass through a conventional tunnel drier 31 operated in conjunction with a suction fan 32 and suitable source of heat as is usual in tunnel driers.

The dried batt is then passed over guide 33 onto the travelling belt 34 operated by pulleys. The belt may be made up of woven silica fibers or be a metallic belt made of material which is dimensionally stable at temperatures of about 1500 to 2000° F. The batt passing with belt 34 through the furnace 37 is exposed to the flames from burners 38 and heated to a temperature of 1500–2000° F. to dehydrate and shrink the fibers. The shrinkage of the fibers on heating improves the interlock between the fibers in the batt.

The fired batt is fed off belt 34 to belt 39 via guide 40 and is air-cooled during passage of the belt driven pulleys 41 and 42. The cooled batt is fed off the end of the belt 39 and wound into rolls 43.

While I have described a particular embodiment of my invention for the purpose of illustration, it should be understood that various modifications and adaptations thereof may be made within the spirit of the invention as set forth in the appended claims.

I claim:

1. A method of forming shrunk batts of interlaced shrunk silica fibers of short length, which comprises suspending short lengths of individual glass fibers in a leaching solution to extract non-siliceous glass-forming oxide from the glass and to form silica fibers, separating the leaching solution from the silica fibers, filtering a suspension of said silica fibers to form a batt of said silica fibers, heating said batt of interlaced short fibers to an elevated temperature to dehydrate and shrink said batt at said elevated temperature.

2. A method of forming shrunk batts of interlaced silica fibers, each fiber being of short length, which comprises suspending short lengths of individual glass fibers in a leaching solution to extract the non-siliceous glass-forming oxides from said glass fibers, producing a suspension of hydrated silica fibers in said leaching solution, separating said hydrated silica fibers from said leaching solution, subsequently washing and filtering said hydrated silica fibers to produce a batt of interlaced short hydrated silica fibers, heating said batt to an elevated temperature to dehydrate said fibers and shrink said silica fibers and said batt.

3. A method of forming shrunk batts of interlaced silica fibers of short length, which comprises suspending glass fibers in a leaching solution to extract the non-siliceous glass-forming oxides from said glass fibers, producing a suspension of hydrated silica fibers substantially free of said non-siliceous metallic oxides in said leaching solution, removing said leaching solution from the hydrated silica fibers, subsequently washing said fibers with water and forming a suspension of said hydrated silica fibers in the water, separating the water from said hydrated fibers to form a batt of interlaced hydrated silica fibers, heating said batt to dehydrate said fibers and to shrink said batt.

4. A method of forming shrunk batts of interlaced silica fibers of short length, which comprises suspending short lengths of glass fibers in an acid solution said acid being chosen from the group consisting of hydrochloric acid, nitric acid, acetic and trichloracetic acid, to leach from the suspended glass fibers a major portion of the non-siliceous glass-forming oxides of said glass, and to form a suspension of hydrated silica fibers in said acid, separating the acid solution containing the dissolved material from the hydrated silica fibers, water washing the separated fibers substantially free of acid, forming a suspension of said washed fibers in water, filtering said suspension to form a batt of hydrated silica fibers of short length, subsequently heating said batt to an elevated temperature, to dehydrate and shrink said fibers and said batt.

5. A method of forming shrunk batts of interlaced silica fibers of short length, which comprises suspending said fibers in dilute hydrochloric acid solution to extract the non-siliceous metallic oxides from the glass, forming short fibers of hydrated silica substantially free of non-siliceous metallic oxides suspended in spent hydrochloric acid containing chlorides, separating the spent acid from said hydrated silica fibers, washing the fibers substantially free of chlorides, forming a suspension of said washed hydrated short length fibers in water, separating the water from said fibers to form a batt of interlaced short length hydrated silica fibers, heating said batt to an elevated temperature to dehydrate said fibers and to shrink said batt.

6. A method of forming felts of silica fibers which comprises leaching glass fibers with a leaching solution to extract the non-siliceous glass forming oxides from the glass and to form hydrated silica fibers, and filtering a suspension of said hydrated silica fibers to form a felt of said hydrated silica fibers.

7. A method of forming felts of silica fibers which comprises suspending glass fibers in a leaching solution to extract non-siliceous glass-forming oxides from the glass and to form hydrated silica fibers, separating the leaching solution from the silica fibers, forming an aqueous suspension of said hydrated silica fibers, and felting the hydrated silica fibers from said aqueous suspension.

8. A method of forming felts of silica fibers which comprises leaching glass fibers with a leaching solution to extract non-siliceous glass-forming oxides from the glass and to form hydrated silica fibers, filtering a suspension of said hydrated silica fibers to form a felt of said hydrated silica fibers, heating said felt to an elevated temperature to dehydrate and shrink said felt.

LEON PARKER.

References Cited in the file of this patent

UNITED STATES PATENTS

| Number | Name | Date |
|---|---|---|
| 2,217,005 | Clapp | Oct. 8, 1940 |
| 2,286,275 | Hood et al. | June 16, 1942 |
| 2,338,463 | Skaupy et al. | Jan. 4, 1944 |
| 2,459,803 | Francis, Jr. | Jan. 25, 1949 |
| 2,461,841 | Nordberg | Feb. 15, 1949 |
| 2,483,405 | Francis, Jr. | Oct. 4, 1949 |
| 2,500,092 | Parker et al. | Mar. 7, 1950 |
| 2,504,744 | Sproull et al. | Apr. 18, 1950 |

FOREIGN PATENTS

| Number | Country | Date |
|---|---|---|
| 37,900 | Germany | Dec. 2, 1886 |
| 113,887 | Australia | June 24, 1940 |

OTHER REFERENCES

J. Franklin Inst., pg. 457, June 1946.